United States Patent
Turnquist et al.

(10) Patent No.: US 6,502,823 B1
(45) Date of Patent: Jan. 7, 2003

(54) ACTUATING SEAL CARRIER FOR A TURBINE AND METHOD OF RETROFITTING

(75) Inventors: Norman Arnold Turnquist, Sloansville, NY (US); Mehmet Demiroglu, Troy, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/683,277

(22) Filed: Dec. 7, 2001

(51) Int. Cl.[7] .......................... F01D 11/02; F16J 15/447
(52) U.S. Cl. ...................... 277/355; 277/416; 277/544; 277/546
(58) Field of Search ................................ 277/355, 393, 277/421, 422, 416, 493, 495, 543–6, 470, 486

(56) References Cited

U.S. PATENT DOCUMENTS

| | | | |
|---|---|---|---|
| 331,454 A | * 12/1885 | Simonds | |
| 2,279,814 A | * 4/1942 | Dickinson | |
| 2,279,863 A | * 4/1942 | Downer | |
| 2,614,870 A | * 10/1952 | Ray | |
| 2,761,709 A | * 9/1956 | Gilbert, Sr. | |
| 5,971,400 A | 10/1999 | Turnquist et al. | |
| 6,105,966 A | 8/2000 | Turnquist et al. | |

OTHER PUBLICATIONS

Centre for the Analysis and Dissemination of Demonstrated Energy Technologies (CADDET), "*Clearance Control System for a Steam Turbine*", Result 126, JP 91.00/5X.F05, 4 pages, Feb. 1993.

* cited by examiner

*Primary Examiner*—Anthony Knight
*Assistant Examiner*—Alison K. Pickard
(74) *Attorney, Agent, or Firm*—Enrique Abarca; Donald S. Ingraham

(57) ABSTRACT

A seal assembly is provided for a rotary machine wherein the rotary machine comprises a rotor and a casing. The rotor comprises a generally longitudinally-extending axis wherein the casing is generally coaxially aligned with the axis. The casing circumferentially surrounds and is radially spaced apart from the rotor wherein the casing comprises an inner circumferential channel generally coaxially aligned with the rotor. The seal assembly comprises a plurality of seal segments disposable in a circumferential array in the channel so as to be movable between radially inward and radially outward positions. In addition, the seal assembly comprises a plurality of displacement apparatuses comprising at least one fluid inlet and configured for urging apart the seal segments upon introduction of a fluid medium in the fluid inlet. Each of the seal segments comprises an end having at least one of the displacement apparatuses circumferentially disposed thereon.

13 Claims, 2 Drawing Sheets

ACTUATING SEAL CARRIER FOR A TURBINE AND METHOD OF RETROFITTING

BACKGROUND OF INVENTION

The present invention relates generally to rotary machines, and more particularly to actuated seals for rotary machines such as steam and gas turbines.

Rotary machines include, without limitation, turbines for steam turbines and compressors and turbines for gas turbines. A steam turbine has a steam path that typically includes, in serial-flow relationship, a steam inlet, a turbine, and a steam outlet. A gas turbine has a gas path which typically includes, in serial-flow relationship, an air intake (or inlet), a compressor, a combustor, a turbine, and a gas outlet (or exhaust nozzle). Gas or steam leakage, either out of the gas or steam path or into the gas or steam path, from an area of higher pressure to an area of lower pressure, is generally undesirable. For example, a gas path leakage in the turbine or compressor area of a gas turbine, between the rotor of the turbine or compressor and the circumferentially surrounding turbine or compressor casing, will lower the efficiency of the gas turbine leading to increased fuel costs. Also, steam-path leakage in the turbine area of a steam turbine, between the rotor of the turbine and the circumferentially surrounding casing, will lower the efficiency of the steam turbine leading to increased fuel costs.

It is known in the art of steam turbines to position, singly or in combination, variable clearance labyrinth seal carrier segments and brush seals in a circumferential array between the rotor of the turbine and the circumferentially surrounding turbine casing to minimize steam-path leakage. The ends of coil springs engage circumferentially-opposing and generally-matching holes in circumferentially-adjacent seal segments. The coil springs circumferentially urge apart the circumferentially-adjacent seal segments. In addition, such circumferentially-urging-apart causes the seal segments to move radially outward within a channel in the casing. This prevents damage to the labyrinth-seal teeth from transient radial movement of the rotor during turbine startup. While the coil springs have proved to be quite reliable, performance of the coil springs and the radially inward movement of the circumferentially-adjacent seal segments is dependent on the internal pressure of the turbine which at times is an non-uniform pressure on the seal segments thereby opening the seal clearance between the turbine casing and the rotor.

Accordingly, there is a need in the art for a rotary machine having improved leakage control between stationary and rotating components.

SUMMARY OF INVENTION

One embodiment of the present invention comprises a seal assembly for a rotary machine wherein the rotary machine comprises a rotor and a casing. The rotor comprises a generally longitudinally-extending axis wherein the casing is generally coaxially aligned with the axis. The casing circumferentially surrounds and is radially spaced apart from the rotor wherein the casing comprises an inner circumferential channel generally coaxially aligned with the rotor. The seal assembly comprises a plurality of seal segments disposable in a circumferential array in the channel so as to be movable between radially inward and radially outward positions. In addition, the seal assembly comprises a plurality of displacement apparatuses comprising at least one fluid inlet and configured for urging apart the seal segments upon introduction of a fluid medium in the fluid inlet. Each of the seal segments comprises an end having at least one of the displacement apparatuses circumferentially disposed thereon.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
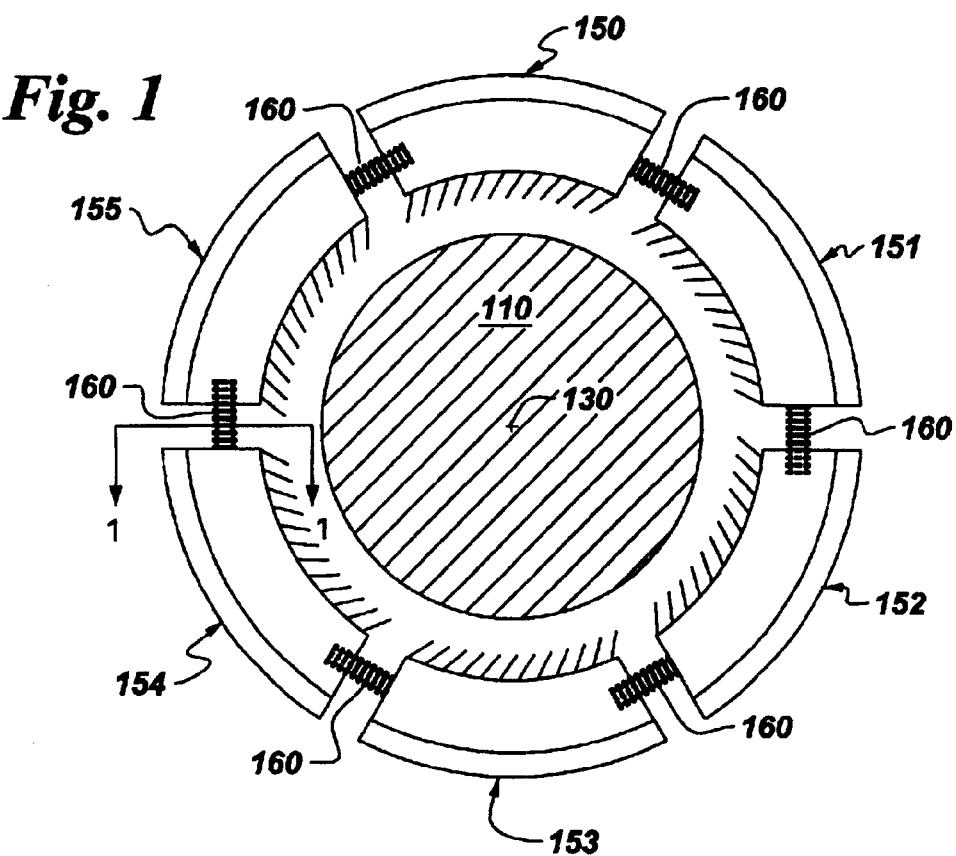
FIG. 1 is an end elevational view of a seal assembly in an open position wherein the seal assembly comprises a plurality of seal segments and at least one displacement apparatus secured to each respective seal segment in accordance with one embodiment of the present invention.
Figure 2:
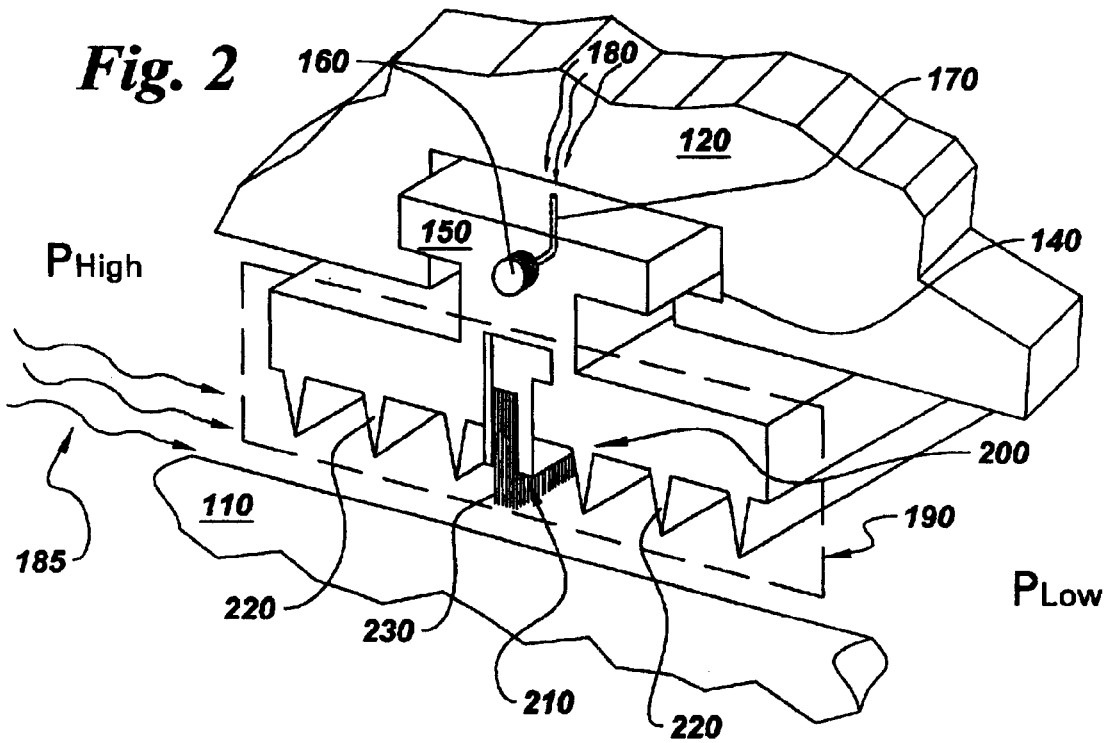
FIG. 2 is a schematic, cross sectional view of the seal assembly of FIG. 1 taken along lines 1—1.

Referring now to the drawings, FIG. 1 and FIG. 2 schematically show a seal assembly 100 for a rotary machine (only a portion of which is shown in the Figures) where the rotary machine comprises a rotor 110, for example a turbine rotor (see FIG. 1), and a casing 120, for example, a turbine casing (see FIG. 2). It will be appreciated that FIG. 2 is a schematic, cross sectional view of FIG. 1 taken along lines 1—1. The rotor 110 may, without limitation, be constructed as a single monolithic rotor or as two or more longitudinally-attached rotor segments. The casing 120 may, without limitation, be constructed as a single monolithic casing or a plurality of longitudinally-attached casing segments. The term "rotor" includes a shaft, disk, wheel, and the like. The rotor 110 comprises a generally longitudinally-extending axis 130, and the casing 120 is generally coaxially aligned with the axis 130 (see FIG. 2). The casing 120 circumferentially surrounds and is radially spaced apart from the rotor 110. In addition, the casing 120 comprises an inner circumferential channel 140 generally coaxially aligned with the rotor 110.

Seal assembly 100 comprises a plurality of seal segments 150, 151, 152, 153, 154, 155 disposable in a circumferential array in the channel 140 so as to be movable between radially inward (see FIG. 3) and radially outward (see FIG. 1) positions. In addition, each seal segment 150, 151, 152, 153, 154, 155 comprises an end having at least one displacement apparatus 160 circumferentially disposed thereon. Each of said displacement apparatuses 160 comprises at least one fluid inlet 170 and is configured for urging apart said seal segments 150, 151, 152, 153, 154, 155 upon introduction of a fluid medium 180 in said fluid inlet 170 (see FIG. 2). The seal segments 150, 151, 152, 153, 154, 155 comprise at least one seal 190 wherein the seal 190 is selected from the group consisting of brush seal bristles 210, labyrinth teeth seals 200, abradable seals, honeycomb seals, leaf seals, finger seals, ceramic seals, aramid seals, aspirating seals and combinations thereof.

In one embodiment, seal assembly 100 is disposed in a rotary machine such as an electric generator or, more specifically, a hydrogen cooled electric generator. In another embodiment, the seal assembly 100 is disposed in medical equipment such as equipment employing x-ray tube devices. In a further embodiment, the seal assembly 100 is disposed in turbomachinery such as a centrifugal compressor, a steam turbine, or a gas turbine typically used in aircraft engines or used by power utility companies. It is noted that the invention is not limited to the examples expressed herein and can also be associated with any machine experiencing a pressure drop during machine operation. In addition, the seal assembly 100 is not limited to a moving or rotating portion of the machine and can be employed between two components having no relative motion. For illustrative purposes, it will be appreciated that a turbine fluid medium 185 in a turbine fluid path flows from the high pressure side designated "PHI", towards, the low pressure side, designated "PLOW", i.e., from the left to the right of drawing FIG. 2.

In an exemplary embodiment, displacement apparatuses 160 are typically disposed on at least one of the seal segment 150, 151, 152, 153, 154, 155 ends. As used herein, directional words such as, for example, "on", "in", "over", "above", and "under" are used to refer to the relative location of elements of seal assembly 100 as illustrated in the Figures and are not meant to be limitations in any manner with respect to the orientation or operation of seal assembly 100. In one embodiment, the displacement apparatuses 160 are positioned in the same location on each of the seal segment 150, 151, 152, 153, 154, 155 ends. In an alternative embodiment, it will be appreciated that the number and position of displacement apparatuses 160 may vary. Displacement apparatuses 160 typically comprise, but are not limited to, pneumatic actuators, hydraulic actuators and combinations thereof. In an exemplary embodiment, displacement apparatuses 160 typically comprise bellows or cylinder actuators.

Figure 3:
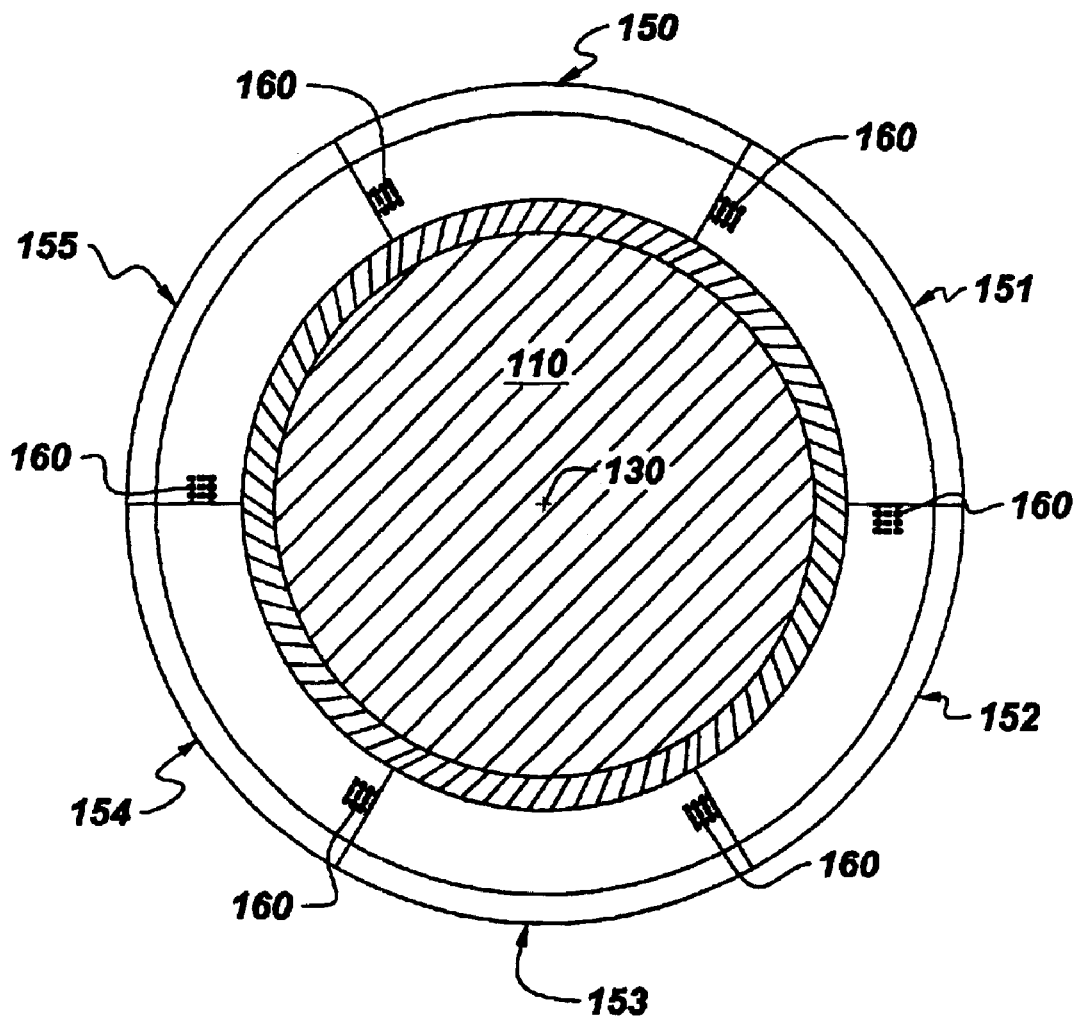
FIG. 3 is an end elevational view of the seal assembly of FIG. 1 in a closed position.

In operation, the fluid medium 180 enters the fluid inlet 170 thereby expanding the displacement apparatuses 160 and consequently urging (pushing) apart the seal segments 150, 151, 152, 153, 154, 155. In an exemplary embodiment, the fluid medium 180 enters the fluid inlet 170 so as to longitudinally actuate the bellows, for example, thereby longitudinally urging apart the seal segments 150, 151, 152, 153, 154, 155 and displacing seal segments 150, 151, 152, 153, 154, 155 radially outward from the rotor 110. Here, the plurality of seal segments 150, 151, 152, 153, 154, 155 are moved between a radially inward position, designated the "closed" position (as shown in FIG. 3), and a radially outward position, designated the "open" position (as shown in FIG. 1). In other words, in the closed position the seal segments 150, 151, 152, 153, 154, 155 are closer to the rotor 110 as compared with the open position wherein the seal segments 150, 151, 152, 153, 154, 155 are farther from the rotor 110. In the open position, each of the displacement apparatuses 160 circumferentially urges apart circumferentially adjacent seal segments 150, 151, 152, 153, 154, 155, for example, adjacent seal segments 150 and 151 which results in increasing the radial distance between the seal 190 and the rotor 110. It will be appreciated that in one embodiment of the present invention, seal segments 150, 151, 152, 153, 154, 155 are typically disposed in the closed position and positioned adjacent to the rotor 110 by springs (not shown) disposed on seal segments 150, 151, 152, 153, 154, 155 that provide a radially inward force. As such, displacement apparatuses 160 are designed so as to provide the necessary force to urge apart seal segments 150, 151, 152, 153, 154, 155 in an open position.

FIG. 2 shows seal segment 150 comprising the seal 190 having the labyrinth teeth seal 200 and the brush seal bristles 210 therein. Increasing the radial distance between the labyrinth teeth seal 200, for example, and the rotor 110 and the radial distance between the brush seal bristles 210, for example, and the rotor 110 protects the teeth 220 and the bristles 230 from damaging contact with a vibrating and oscillating rotor 110 during transient events. "Transient events", as used herein, refers to events in the rotary machine during startup and shutdown, for example. It will be appreciated that when such transient rotor vibrations and oscillations have settled out during steady-state operating conditions, seal segments 150, 151, 152, 153, 154, 155 are typically urged into a closed position as shown in FIG. 3. While in the closed position, the seal 190 of seal segments 150, 151, 152, 153, 154, 155 is disposed adjacent to the rotor 110 so as to separate pressure regions on axially opposite sides of the seal segments 150, 151, 152, 153, 154, 155 (see FIG. 2).

In operation, a method of retrofitting the seal assembly 100 in the rotary machinery comprises disposing the plurality of seal segments 150, 151, 152, 153, 154, 155 in a circumferential array in the channel 140. Here, it will be appreciated that the seal segments 150, 151, 152, 153, 154, 155 are movable between radially inward and radially outward positions. In addition, such method of retrofitting the seal assembly 100 comprises circumferentially disposing at least one displacement apparatus 160 on at least one respective end of each of the seal segments 150, 151, 152, 153, 154, 155 wherein the displacement apparatuses 160 comprise at least one fluid inlet 170 and are configured for urging apart the seal segments 150, 151, 152, 153, 154, 155 upon introduction of the fluid medium 180 in the fluid inlet 170. One advantage to such method of retrofitting the seal assembly 100 in the turbine, for example, is that seal assembly 100 is simply removed and replaced with another seal assembly 100 and down time of the turbine is thereby reduced. In some operations, such method of retrofitting allows a technician to replace seal assembly 100 without having to disassemble any major parts of the rotary machinery thereby reducing repair costs.

It will be apparent to those skilled in the art that, while the invention has been illustrated and described herein in accordance with the patent statutes, modification and changes may be made in the disclosed embodiments without departing from the true spirit and scope of the invention. It is, therefore, to be understood that the appended claims are intended to cover all such modifications and changes as fall within the true spirit of the invention.

What is claimed is:

1. A seal assembly for a rotary machine, said rotary machine comprising a rotor and a casing, said rotor comprising a generally longitudinally-extending axis, said casing generally coaxially aligned with said axis, said casing circumferentially surrounding and radially spaced apart from said rotor, said casing comprising an inner circumferential channel generally coaxially aligned with said rotor, and said seal assembly comprising:

a plurality of seal segments disposable in a circumferential array in said channel so as to be movable between radially inward and radially outward positions; and a plurality of displacement apparatuses, each seal segment comprising an end having at least one of said displacement apparatuses circumferentially disposed thereon, each of said displacement apparatuses comprising at least one fluid inlet and configured for urging apart said seal segments upon introduction of a fluid medium in said fluid inlet.

2. The seal assembly of claim 1, wherein said rotary machine is selected from the group consisting of electric generators, steam turbines, gas turbines and x-ray tubes.

3. The seal assembly of claim 1, wherein each of said seal segments comprises at least one seal, said seal selected from the group consisting of brush seal bristles, labyrinth teeth seals, abradable seals, honeycomb seals, leaf seals, finger seals, ceramic seals, aramid seals, aspirating seals and combinations thereof.

4. The seal assembly of claim 1, wherein each of said displacement apparatuses is selected from the group consisting of a pneumatic actuator, a hydraulic actuator and a combination thereof.

5. The seal assembly of claim 1, wherein each of said displacement apparatuses comprises a bellows.

6. The seal assembly of claim 1, wherein each of said displacement apparatuses comprises a cylinder actuator.

7. A turbine comprising:
- a turbine rotor comprising a generally longitudinally-extending axis;
- a turbine casing generally coaxially aligned with said axis, said casing circumferentially surrounding and radially spaced apart from said rotor, said casing comprising an inner circumferential channel generally coaxially aligned with said rotor;
- a plurality of seal segments disposed in a circumferential array in said channel so as to be movable between radially inward and radially outward positions; and
- a plurality of bellows, each seal segment comprising an end having at least one of said bellows circumferentially disposed thereon, each of said bellows comprising at least one fluid inlet and configured for urging apart said seal segments upon introduction of a fluid medium in said fluid inlet.

8. The turbine of claim 7, wherein said turbine is selected from the group consisting of steam turbines and gas turbines.

9. The turbine of claim 7, wherein each of said seal segments comprises at least one seal, said seal selected from the group consisting of brush seal bristles, labyrinth teeth seals, abradable seals, honeycomb seals, leaf seals, finger seals, ceramic seals, aramid seals, aspirating seals and combinations thereof.

10. A method of retrofitting a seal assembly in a turbine, said turbine comprising a turbine rotor and a turbine casing, said rotor comprising a generally longitudinally-extending axis, said casing generally coaxially aligned with said axis, said casing circumferentially surrounding and radially spaced apart from said rotor, said casing comprising an inner circumferential channel generally coaxially aligned with said rotor, and said method of retrofitting comprising:

- disposing a plurality of seal segments in a circumferential array in said channel,
- said seal segments movable between radially inward and radially outward positions; and
- circumferentially disposing at least one displacement apparatus on at least one respective end of each of said seal segments, said displacement apparatus comprising at least one fluid inlet and configured for urging apart said seal segments upon introduction of a fluid medium in said fluid inlet.

11. The method of claim 10, wherein each of said displacement apparatuses is selected from the group consisting of a pneumatic actuator, a hydraulic actuator and a combination thereof.

12. The method of claim 10, wherein each of said displacement apparatuses comprises a bellows.

13. The method of claim 10, wherein each of said displacement apparatuses comprises a cylinder actuator.

* * * * *